United States Patent
Huppertz et al.

(10) Patent No.: US 7,884,329 B2
(45) Date of Patent: Feb. 8, 2011

(54) DEVICE AND METHOD FOR DETECTING ELECTROMAGNETIC RADIATION

(75) Inventors: Juergen Huppertz, Duisburg (DE); Bedrich Hosticka, Muelheim an der Ruhr (DE); Daniel Wuerfel, Gladbeck (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 12/162,630

(22) PCT Filed: May 8, 2007

(86) PCT No.: PCT/EP2007/004061

§ 371 (c)(1),
(2), (4) Date: Aug. 15, 2008

(87) PCT Pub. No.: WO2008/135068

PCT Pub. Date: Nov. 13, 2008

(65) Prior Publication Data

US 2010/0224787 A1    Sep. 9, 2010

(51) Int. Cl.
*G01J 5/20*    (2006.01)

(52) U.S. Cl. .................................... 250/338.4; 250/332
(58) Field of Classification Search ................. 250/332, 250/338.4, 370.15
See application file for complete search history.

(56) References Cited

U.S. PATENT DOCUMENTS 5,952,659 A    9/1999    Yoneyama et al.

FOREIGN PATENT DOCUMENTS

EP    0 139 408 A1    5/1985

OTHER PUBLICATIONS

Official communication issued in counterpart International Application No. PCT/EP/2007/004061, mailed on Feb. 1, 2008.
Shepherd et al.: "Application of Schottky Barrier Bolometer Arrays to Cooled Sensors," XP007903899; Proceedings of SPIE; vol. 4130; Dec. 2000; pp. 86-93.

*Primary Examiner*—David P Porta
*Assistant Examiner*—Mark R Gaworecki
(74) *Attorney, Agent, or Firm*—Keating & Bennett, LLP

(57) ABSTRACT

A device for detecting electromagnetic radiation, with a diode structure acting absorbingly for the electromagnetic radiation and having a diode, and an ascertainer for ascertaining a measurement value for the absorbed electromagnetic radiation by means of at least two current/voltage measurements at the diode for different pairs of a diode current and a diode voltage.

18 Claims, 11 Drawing Sheets

DEVICE AND METHOD FOR DETECTING ELECTROMAGNETIC RADIATION

BACKGROUND OF THE INVENTION

The present invention concerns devices and methods for detecting electromagnetic radiation, in particular, for detecting an energy, or power, density of electromagnetic radiation.

Electromagnetic waves may be detected by help of a so-called bolometer, for example. A bolometer includes a radiation sensor which is able to detect radiated energy, or power, density of mostly weak light, infrared, ultraviolet or microwave sources by registration of a heating of the radiation sensor which occurs by absorption.

A schematic construction of a bolometer is shown in FIG. 1.

Bolometer 10 comprises a radiation sensor 12 including an absorber attached on a substrate 14. Normally, an isolation layer 16 is located between the absorber and the substrate 14 for thermal isolation of the absorber from substrate 14. Here, the thermal isolation may be made by a vacuum, for example, that is, the absorber is arranged at a distance d from the substrate 14. This may be realized, for example, by hanging the absorber over the substrate 14 by spacers which at the same time may function as electrodes. As indicated in FIG. 1, additional isolation material 16 may be provided between the absorber and substrate 14 to achieve a particular thermal isolation. The temperature of the absorber increases with respect to the substrate 14 by incoming electromagnetic radiation 18. Then, changes in temperature of the absorber and, thus, indirectly the amount of radiation arrived are detected by a heat detection structure of the radiation sensor 12. For example, a diode or a temperature-dependent resistor changing the current/voltage characteristic by heating the absorber is used in cooperation with the absorber 12.

Electromagnetic radiation sources may be astronomical objects, for example. A substantial feature of a bolometer compared to other radiation detectors, such as photocells or photodiodes, consists in a wide-band reception characteristic as well as a possibility for detecting radiation which is not, or only hardly, detectable, such as remote infrared or terahertz radiation.

Depending on the wavelength of a radiation source to be examined as well as the reaction time and sensitivity of a bolometer, different radiation sensors, or absorbers 12, are utilized. For example, thin, free-hanging, absorbing metal bands, free-hanging small thermistors, thin-layer structures for short reaction times or superconductive sensors for very high sensitivities are common.

The heat effect caused by the electromagnetic radiation 18 changes a temperature-dependent ohmic resistance R(T) of the sensor, or absorber 12, for example. The resistance R(T) may be measured at a voltage present on the absorber by means of a current measuring device, for example. Thus, conclusions concerning the power density of the absorbed electromagnetic radiation 18 may be drawn. The temperature-dependent ohmic resistance R(T) of a resistor cooperating with the absorber or thermally coupled thereto may generally be described according to $$R(T) = R_0 \cdot (1 + \alpha(T - T_0)), \quad (1)$$

wherein $R_0$ denotes a nominal resistance at a nominal temperature $T_0$. $\alpha$ designates a temperature coefficient of the temperature-dependent resistance R(T).

When fabricating sensors, or absorbers 12, tolerances generally occur both in the nominal resistance $R_0$ and the temperature coefficient $\alpha$. For this reason, the sensors 12 have to be calibrated. Particularly with imaging systems with a plurality of pixels, this leads to large calibration tables which have to be stored.

An arrangement of a plurality of bolometers 10 in a matrix for an imaging system is shown by way of example in FIG. 2.

FIG. 2 exemplarily illustrates a 3×3 matrix of bolometers 10, wherein each bolometer 10 corresponds to an image point, or pixel. A particular bolometer 10, i.e. a particular pixel, may be controlled, or readout, in the system illustrated in FIG. 2 by selecting a column and a row of the matrix.

With absorbers, or sensors 12, the temperature T of which is not held constant to save temperature regulation, for example, there are own calibration data for different temperature ranges, e.g. at a distance of some degree Celsius. In imaging systems, these data have to be individually ascertained and stored for each bolometer 10 by a calibration.

In many cases, it is not sufficient to correct images ascertained with an imaging system (such as exemplarily illustrated in FIG. 2) only by help of the calibration data. Rather, an offset balancing has additionally to be made on a temporally periodical basis. For this, a bolometer 10 is covered, for example, by sluing a plate, a so-called shutter, in front of the bolometer 10 so as to shield it from the electromagnetic radiation. For example, all bolometers are intermittently covered by the shutter. In particular, reference images may be generated, from which the offset (e.g. the nominal resistance $R_0$) may be determined. During this time, no image detection may be made.

In some cases, in bolometers, absorbers are also used in connection with thermally coupled diodes. In this context, a temperature-dependence of the forward, or diode, voltage $U_D$ according to $$U_D(T) = \frac{kT}{q} \cdot \ln \frac{I_D(T)}{I_S(T)} \quad (2)$$

is utilized, wherein T denotes the diode's temperature coupled to the absorber, $k=1.38*10^{-23}$ J/K denotes the Boltzmann constant, q denotes the elementary charge, $I_D(T)$ denotes a temperature-dependent diode current and $I_S(T)$ denotes a temperature-dependent diode reverse current. The diode reverse current $I_S(T)$, that is, the current through a reverse-operated diode, depends on the fabrication and causes an offset voltage which has to be compensated. As a rule, this is made by calibration.

Radiation detectors, or bolometers, in which no calibration, or offset measurement, or less calibration effort is needed, would be desirable.

SUMMARY

According to an embodiment, a device for detecting electromagnetic radiation may have: a diode structure acting absorbingly for electromagnetic radiation and having a diode; and an ascertainer for ascertaining a measurement value for the absorbed electromagnetic radiation by means of at least two current/voltage measurements at the diode for different pairs of a diode current and a diode voltage.

According to another embodiment, a method for detecting electromagnetic radiation may have the steps of: absorbing the electromagnetic radiation with a diode structure acting absorbingly for the electromagnetic radiation and having a diode; and ascertaining a measurement value for the absorbed electromagnetic radiation by means of at least two current/ voltage measurements at the diode for different pairs of a diode current and a diode voltage.

Another embodiment may have a computer program with a program code for performing a method for detecting electromagnetic radiation, the method having the steps of: absorbing the electromagnetic radiation with a diode structure acting absorbingly for the electromagnetic radiation and having a diode; and ascertaining a measurement value for the absorbed electromagnetic radiation by means of at least two current/voltage measurements at the diode for different pairs of a diode current and a diode voltage, when the computer program runs on a computer and/or a microcontroller.

The present invention is based on the knowledge that a measurement value may be ascertained for the absorbed electromagnetic radiation by performing at least two temporally successive current and/or voltage measurements at an absorbing diode structure at different predefined voltages at or different predefined currents through the underlying diode of the diode structure. The measurement value which, according to embodiments, may be a temperature of the diode is determined, according to embodiments, by help of the temperature dependence between the diode voltage $U_D(T)$ and the diode current $I_D(T)$. By a relative consideration of the measurement results of the temporally successive current and/or voltage measurements, the fabrication-dependent diode reverse current $I_S(T)$ and the offset voltage thus caused may be calculated out and the temperature of the diode may be determined.

For this, according to a first embodiment, an impressed diode current $I_D$ is varied, and the resulting temperature-dependent diode voltages $U_D(T)$ are respectively measured.

In a further embodiment, different diode voltages $U_D$ are applied to the diode one after the other, and the temperature and voltage-dependent diode currents $I_D(U_D,T)$ resulting therefrom are respectively measured.

According to embodiments, the diode may be a PN diode, a Schottky diode or a diode formed by organic semiconductors, for example. A bipolar transistor switched as a diode is also possible.

By the at least two temporally successive measurements, the fabrication-dependent reverse current $I_S(T)$ of the diode and the accompanying offset voltage may be calculated.

Thus, an advantage of the present invention is that a bolometer according to embodiments of the present invention may be read out even without a previous calibration of the sensor, or absorber (diode), and without any measurement of the offset voltage during the operation, if necessitated. Thereby, no, or at least less comprehensive, calibration tables need to be stored, that is, storage expenses, e.g. in imaging systems, may be significantly reduced by the present invention.

BRIEF DESCRIPTION OF THE DRAWINGS

Embodiments of the present invention will be detailed subsequently with reference to the appended drawings, in which.

DETAILED DESCRIPTION OF THE INVENTION

Figure 1:
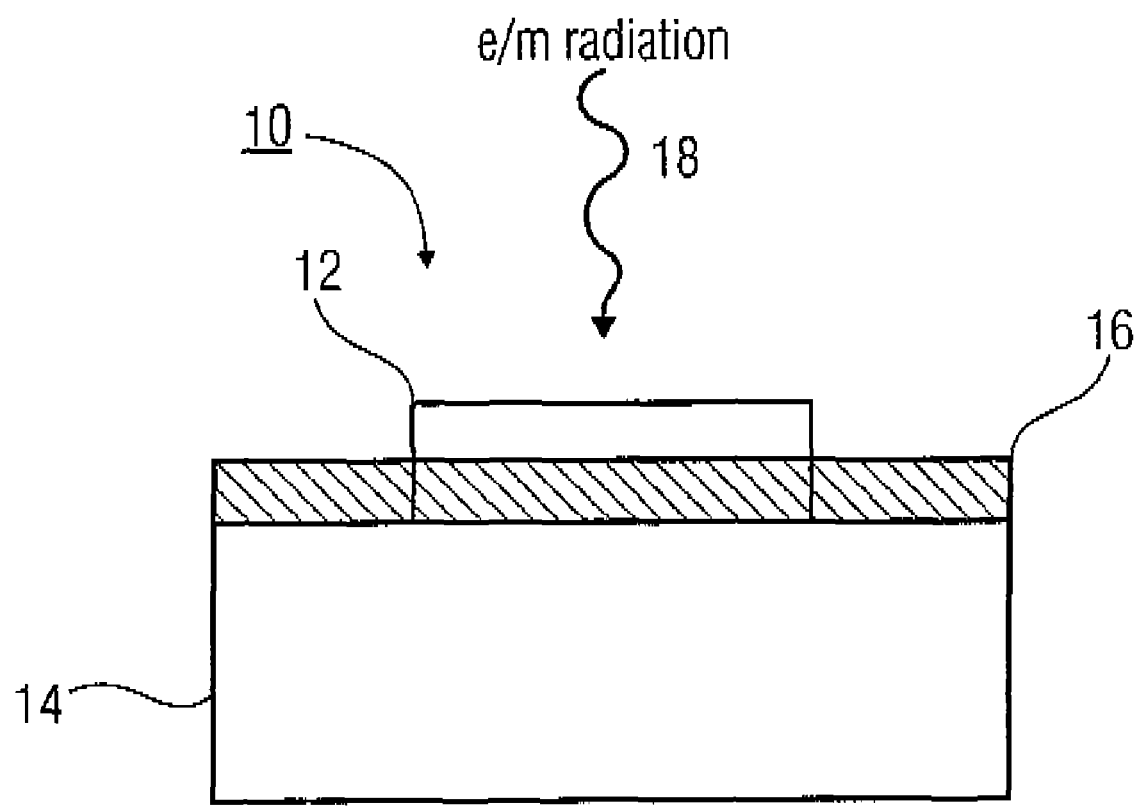
FIG. 1 is a schematic illustration of a construction of a bolometer.

With respect to the following description, it should be noted that in the different embodiments, the same functional elements or functional elements acting in the same way have the same reference numerals, and, thus, the description of these functional elements is interchangeable in different embodiments illustrated in the following.

Figure 3:
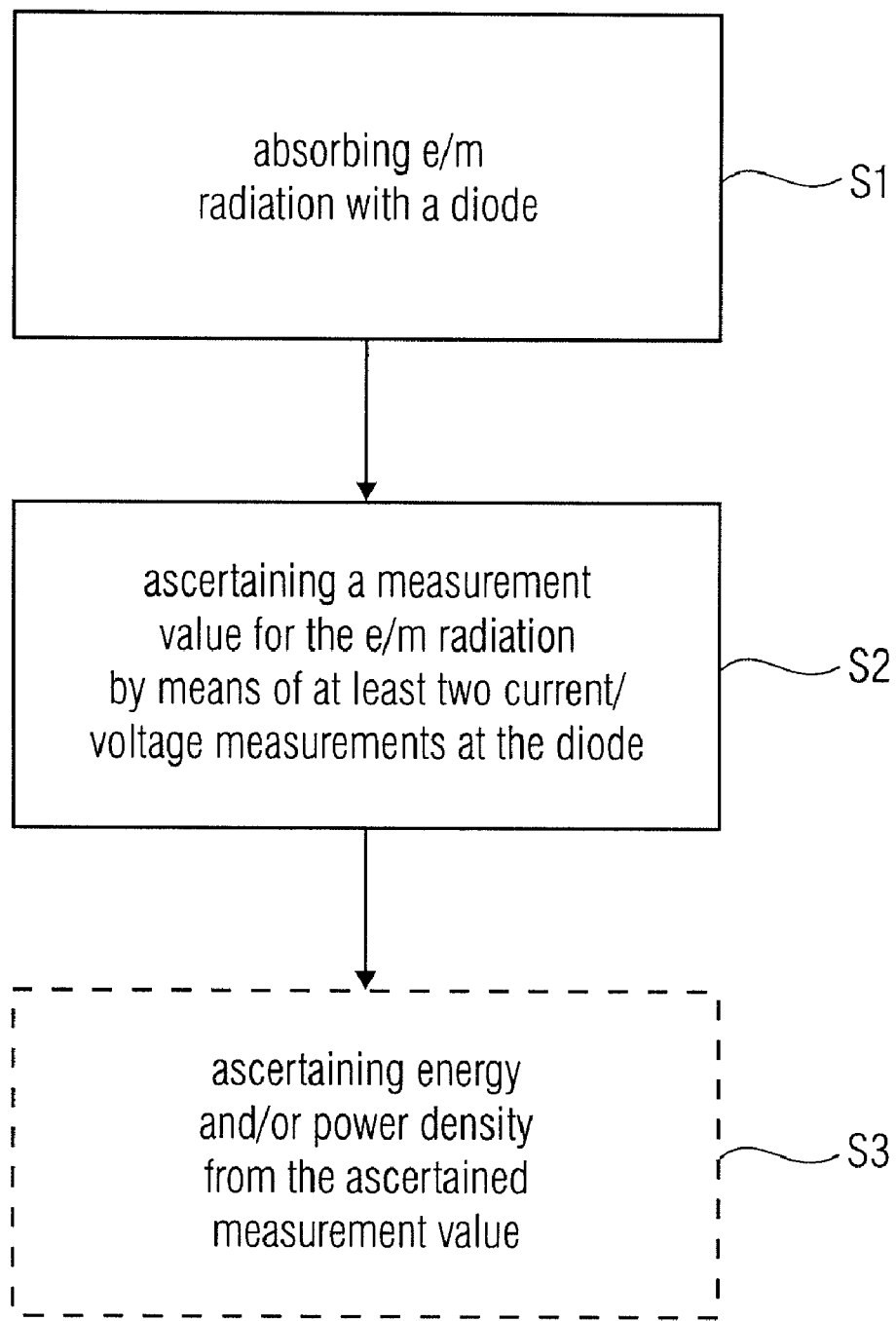
FIG. 3 is a schematic flow diagram for explaining a method for detecting electromagnetic radiation according to an embodiment of the present invention.

FIG. 3 schematically shows a flow diagram of a method for detecting electromagnetic radiation, according to an embodiment of the present invention.

In a first step S1, electromagnetic radiation to be detected is absorbed in a diode structure comprising radiation-absorbing material acting as an absorber and a diode. In a second step S2, a measurement value is ascertained for the absorbed electromagnetic radiation by means of at least two temporally successive current and/or voltage measurements at the diode for different pairs $I_{D,1}$, $I_{D,2}$, $U_{D,1}$, $U_{D,2}$ of a diode current and a diode voltage, wherein the dependence of the diode's current/voltage characteristic on the diode's temperature T has been utilized, which, in turn, changes via the coupling to the absorber material in dependence on the electromagnetic radiation. In an optional third step S3, the energy and/or power density may be ascertained from the ascertained measurement value which, for example, may represent an intermediate value for ascertaining the energy, or power, density, of the electromagnetic radiation.

According to embodiments of the present invention, the measurement value is a temperature T of the diode of the diode structure serving as an absorber for the electromagnetic radiation. A temperature difference $\Delta T$ between the diode structure absorbing the electromagnetic radiation and a substrate on which the diode structure is attached is also possible.

The temperature T of the diode is determined by help of the temperature dependence between the diode voltage $U_D$ and the diode current $I_D$. For this, according to an embodiment, the diode current $I_D$ may be temporally successively varied, that is, two predefined diode currents $I_{D,1}$ and $I_{D,2}$ may successively be impressed to the diode, and thereupon, the respectively resulting diode voltages $U_{D,1}$ and $U_{D,2}$ may be measured. According to a further embodiment, two predefined diode voltages $U_{D,1}$ and $U_{D,2}$ may successively be applied to the diode, and thereupon, the resulting currents $I_{D,1}$ and $I_{D,2}$ may be respectively measured.

Based on the voltages $U_{D,1}$, $U_{D,2}$ and the currents $I_{D,1}$, $I_{D,2}$, the temperature of the diode functioning as an absorber may be determined according to $$T = \frac{q}{k} \cdot \Delta U_D \bigg/ \ln\left(\frac{I_{D,1}}{I_{D,2}}\right) = \frac{\frac{q}{k} \cdot \Delta U_D}{\ln(I_{D,1}) - \ln(I_{D,2})} \quad (3)$$

as will be detailed in the following. In this context, $\Delta U_D$ means a difference of the diode voltages $U_{D,1}$ and $U_{D,2}$.

Figure 4:
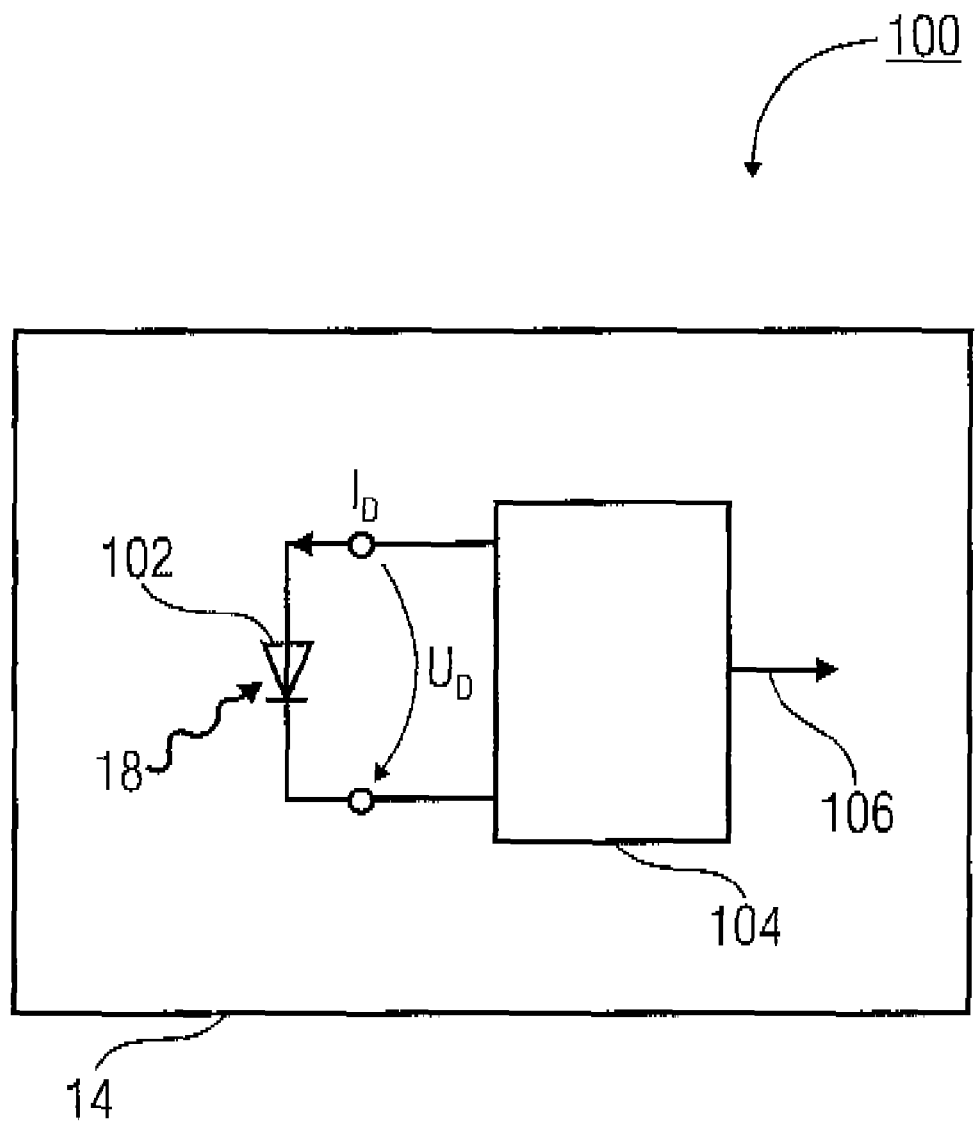
FIG. 4 is a schematic block diagram of a device for detecting electromagnetic radiation, according to an embodiment of the present invention.

FIG. 4 shows a top view of a device, or a bolometer 100 for detecting electromagnetic radiation, according to an embodiment of the present invention.

Device 100 comprises a diode structure 102 with absorbing material for absorbing electromagnetic radiation 18 and a diode changing its forward characteristic due to a temperature change induced by the absorption of electromagnetic radiation. Further, device 100 comprises a means 104 for ascertaining a measurement value 106 for the absorbed electromagnetic radiation 18 by means of at least two current/voltage measurements at the diode structure 102 for different pairs of a diode current $I_D$ and a diode voltage $U_D$.

According to embodiments, the diode structure 102 is formed on a substrate 14 and thermally isolated therefrom. In this context, the thermal isolation at least partly may be accomplished by a vacuum, for example, that is, the diode structure 102 is arranged at a distance d from the substrate 14. This may be realized, for example, by hanging the diode structure over the substrate 14 by spacers which at the same time may function as electrodes. As indicated in FIG. 1, additional isolation material 16 may be provided between the absorbing material of the diode structure 102 and the substrate 14 to achieve a particular thermal isolation.

According to embodiments, the diode structure 102 may comprise a PN diode or a Schottky diode. Furthermore, the diode structure 102 may comprise an organic semiconductor. A bipolar transistor correspondingly switched as a diode is also conceivable.

According to an embodiment, the means 104 for ascertaining the measurement value is formed to ascertain a temperature T of the diode structure 102 due to the absorption of the electromagnetic radiation 18.

In this context, the means 104 is formed to temporally successively impress at least two different diode currents $I_{D,1}$ and $I_{D,2}$ to the diode of the diode structure 102 and, thereupon, to respectively determine the resulting voltages $U_{D,1}$ and $U_{D,2}$.

Figure 5:
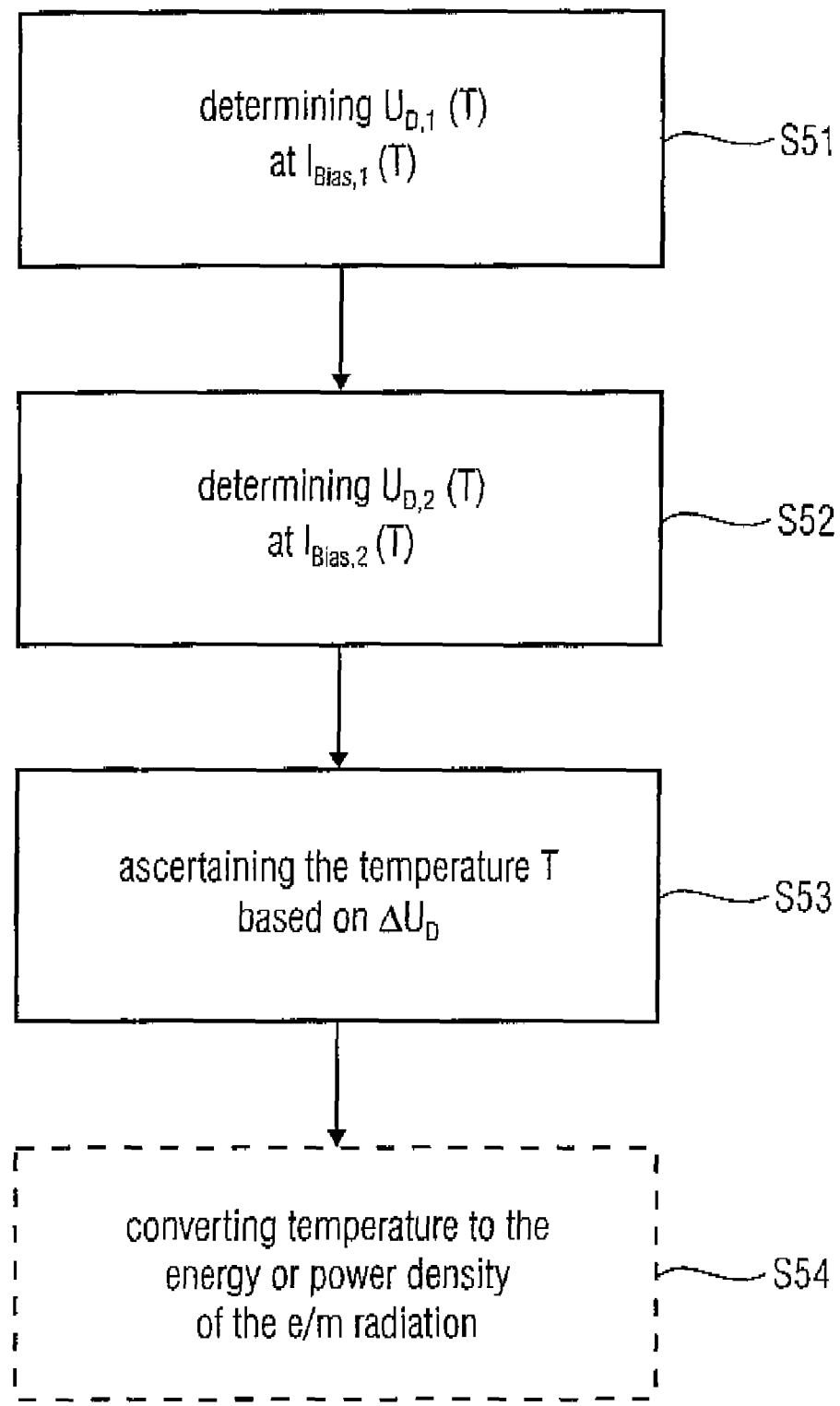
FIG. 5 is a flow diagram for explaining a method for detecting electromagnetic radiation according to an embodiment of the present invention.

A method according to an embodiment of the present invention, in which an impressed diode current $I_D$ is varied and the respective diode voltage $U_D$ resulting therefrom is measured to determine the temperature T is illustrated in FIG. 5.

In a first step S51, a first diode current $I_{D,1}$ is impressed to the diode of the diode structure 102, and a first temperature-dependent diode voltage $U_{D,1}(T)$ resulting therefrom is measured. The first measured temperature-dependent diode voltage $U_{D,1}(T)$ is linked up with the impressed first diode current $I_{D,1}$ according to $$U_{D,1}(T) = \frac{kT}{q} \cdot \ln\frac{I_{D,1}}{I_S(T)} \quad (4)$$

where $k=1.38*10^{-23}$ J/K denotes the Boltzmann constant and q denotes the elementary charge.

In a second step S52, a second predetermined diode current $I_{D,2}$ is impressed to the diode of the diode structure 102 and, thereupon, a second diode voltage $U_{D,2}(T)$ dropping at the diode 102 is measured. In accordance with equation (4), the link between the second diode voltage $U_{D,2}(T)$ and the second impressed diode current $I_{D,2}$ results according to $$U_{D,2}(T) = \frac{kT}{q} \cdot \ln\frac{I_{D,2}}{I_S(T)}. \quad (5)$$

The difference $\Delta U(T)$ of the diode voltages $U_{D,1}$ and $U_{D,2}$ from the both measurements is proportional to the absolute temperature T of the diode due to the absorbed electromagnetic radiation, and by means of equations (4) and (5) may be represented as $$\Delta U_D(T) = \frac{kT}{q} \cdot \left[\ln\frac{I_{D,1}}{I_S(T)} - \ln\frac{I_{D,2}}{I_S(T)}\right] \quad (6)$$

$$= \frac{kT}{q} \cdot [\ln(I_{D,1}) - \ln(I_{D,2})]$$

Since the parameters k, q, $I_{D,1}$, $I_{D,2}$ and $\Delta U_D(T)$ are natural constants, or known parameters, temperature T may be calculated, in a third step S53, according to $$T = \frac{\frac{q}{k} \cdot \Delta U_D}{\ln(I_{D,1}) - \ln(I_{D,2})} \quad (7)$$

In a further optional step S54, an energy, or power, density of the absorbed electromagnetic radiation may additionally be ascertained from the temperature T thus ascertained, if necessitated.

A voltage dropping across the diode of the diode structure 102 is thus respectively determined at two different currents $I_{D,1}$ and $I_{D,2}$.

To be able to use only one diode per bolometer in the present invention, diode voltages are not determined simultaneously with two diodes, or diode groups, but temporally sequentially with only one diode structure 102. As has already been described in the foregoing, the diode structure 102 may also be replaced with a correspondingly connected bipolar transistor.

Due to the fabrication, the reverse current $I_S(T)$ strongly varies between different diodes, and generally, an accurate value is unknown. Since at least two measurements are made at the same diode 102 in the embodiments of the present invention, the reverse current $I_S(T)$ is eliminated in the calculation of temperature T. To achieve a signal swing as large as possible, it may be advantageous to choose the ratio between the currents $I_{D,1}$ and $I_{D,2}$ as large as possible, e.g. larger than or equal to ten. For example, the different diode currents $I_{D,1}$ and $I_{D,2}$ may be adjusted by a pulse width modulation.

Figure 6:
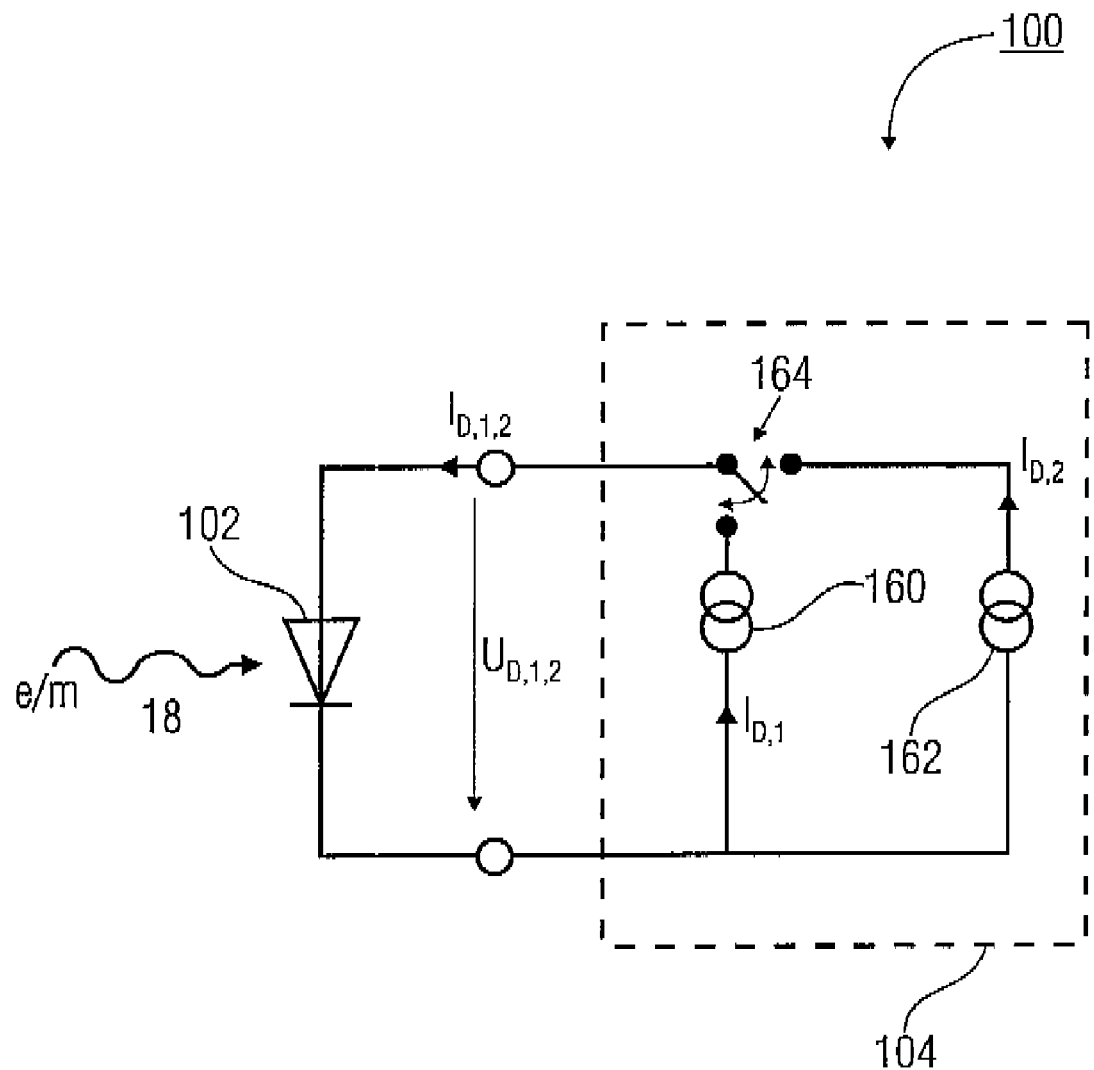
FIG. 6 is a schematic block diagram of a device for performing the method according to FIG. 5.

A device for performing the method described with reference to FIG. 5 is schematically shown in FIG. 6.

According to embodiments, the means 104 for ascertaining the measurement value comprises two constant current sources 160 and 162, which may be selected via a switch 164. Here, the first current source 160 may impress a first diode current $I_{D,1}$ to the diode of the diode structure 102, and the second current source 162 may impress a second diode current $I_{D,2}$ to the diode of the diode structure 102, when selected by switch 164.

To be able to determine the diode voltages $U_{D,1}$ and $U_{D,2}$ resulting from the both diode currents $I_{D,1}$ and $I_{D,2}$, means 104 further comprises a voltage measurement means (not shown) for the diode voltage. As temperature resolutions up to 0.1 mK (millikelvin) may be necessitated for a bolometer with a diode structure comprising a diode and an absorber, it may be advantageous to be able to measure the diode voltages $U_{D,1}$ and $U_{D,2}$ across diode 102 very precisely.

To determine, according to equation (7), temperature T from the measured diode voltages $U_{D,1}$ and $U_{D,2}$ and the both impressed constant currents $I_{D,1}$ and $I_{D,2}$, the means 104 according to embodiments further comprises a processing means, such as a processor with a corresponding program, a decided arithmetic unit or an accordingly programmed FPGA (FPGA=field programmable gate array) (not shown), for ascertaining temperature T.

According to further embodiments, the means 104 for ascertaining the measurement value is formed to temporally successively apply at least two different voltages $U_{D,1}$ and $U_{D,2}$ to the diode of the diode structure 102, and, thereupon, to respectively determine the resulting temperature-dependent currents $I_{D,1}(T)$ and $I_{D,2}(T)$ through the diode of the diode structure 102.

By reversing the measurement method described with reference to FIG. 5, a larger signal swing may be achieved. For this, different voltages $U_{D,1}$ and $U_{D,2}$ are applied across the diode of the diode structure 102, and the resulting current $I_{D,1}(T)$ and $I_{D,2}(T)$ is respectively measured. A corresponding method is outlined in FIG. 7 with reference to a flow diagram.

In a first step S71, a predefined first constant diode voltage $U_{D,1}$ is applied to the diode of the diode structure 102, and, thereupon, a first resulting temperature-dependent diode current $I_{D,1}(U_{D,1}, T)$ is measured. The dependence between the first diode current $I_{D,1}(T)$ and the first predefined applied diode voltage $U_{D,1}$ is given as $$I_{D,1}(U_{D,1}, T) = I_S \cdot e^{\frac{q \cdot U_{D,1}}{k \cdot T}}. \tag{8}$$

In a second step S72, a second predefined constant diode voltage $U_{D,2}$ is applied to the diode of the diode structure 102, and, thereupon, a second resulting temperature-dependent diode current $I_{D,2}(U_{D,2}, T)$ is measured. According to equation (8), the second temperature-dependent diode current $I_{D,2}$ may be written as $$I_{D,2}(U_{D,2}, T) = I_S \cdot e^{\frac{q \cdot U_{D,2}}{k \cdot T}}. \tag{9}$$

If the quotient from measured currents $I_{D,1}(U_{D,1},T)$ and $I_{D,2}(U_{D,2},T)$ is now formed according to $$\frac{I_{D,1}(U_{D,1}, T)}{I_{D,2}(U_{D,2}, T)} = \frac{I_S \cdot e^{\frac{q \cdot U_{D,1}}{k \cdot T}}}{I_S \cdot e^{\frac{q \cdot U_{D,2}}{k \cdot T}}} \tag{10}$$

$$= e^{\frac{q}{k \cdot T}(U_{D,1} - U_{D,2})}$$

$$= e^{\frac{q}{k \cdot T} \cdot \Delta U_D}$$

it will be apparent that the quotient of the currents $I_{D,1}(U_{D,1},T)$ and $I_{D,2}(U_{D,2},T)$ is exponentially dependent on the difference $\Delta U_D$ of the applied constant voltages $U_{D,1}$ and $U_{D,2}$ and the reciprocal of temperature T. In this embodiment, too, the influence of the reverse current $I_S(T)$ may also be compensated, since two temporally sequential measurements are again made at the same diode, or the same diode structure 102. If the previous equation is solved for temperature T, then the temperature may be ascertained in a third step S73 by the processing means previously mentioned, for example, according to $$T = \frac{q}{k} \cdot \Delta U_D \bigg/ \ln\left(\frac{I_{D,1}(U_{D,1}, T)}{I_{D,2}(U_{D,2}, T)}\right) \tag{11}$$

$$= \frac{\frac{q}{k} \cdot \Delta U_D}{\ln(I_{D,1}(U_{D,1}, T)) - \ln(I_{D,2}(U_{D,2}, T))}$$

The absolute value of temperature T may be directly determined from the measured currents $I_{D,1}(U_{D,1},T)$ and $I_{D,2}(U_{D,2},T)$ and the applied voltages $U_{D,1}$ and $U_{D,2}$. Since the quotient of the currents $I_{D,1}(U_{D,1},T)$ and $I_{D,2}(U_{D,2},T)$ is formed, possible gain errors of a processing chain and a downstream analog-to-digital converter do not influence the result in this measurement method.

According to embodiments, an accumulated charge may also be measured instead of a direct measurement of the diode currents $I_{D,1}(U_{D,1},T)$ and $I_{D,2}(U_{D,2},T)$. For this, the diode current is integrated up. By the integration operation, an upper edge frequency of a circuit realizing the method is shifted towards smaller frequencies. Thereby, a noise bandwidth and, thus, the noise may decrease. The integration of the diode current $I_{D,1}$, or $I_{D,2}$, may be controlled depending on the signal. When achieving a predefined saturation, the integration may be interrupted, for example. Thereby, requirements with respect to a possible downstream analog-to-digital converter may be decreased.

Figure 7:
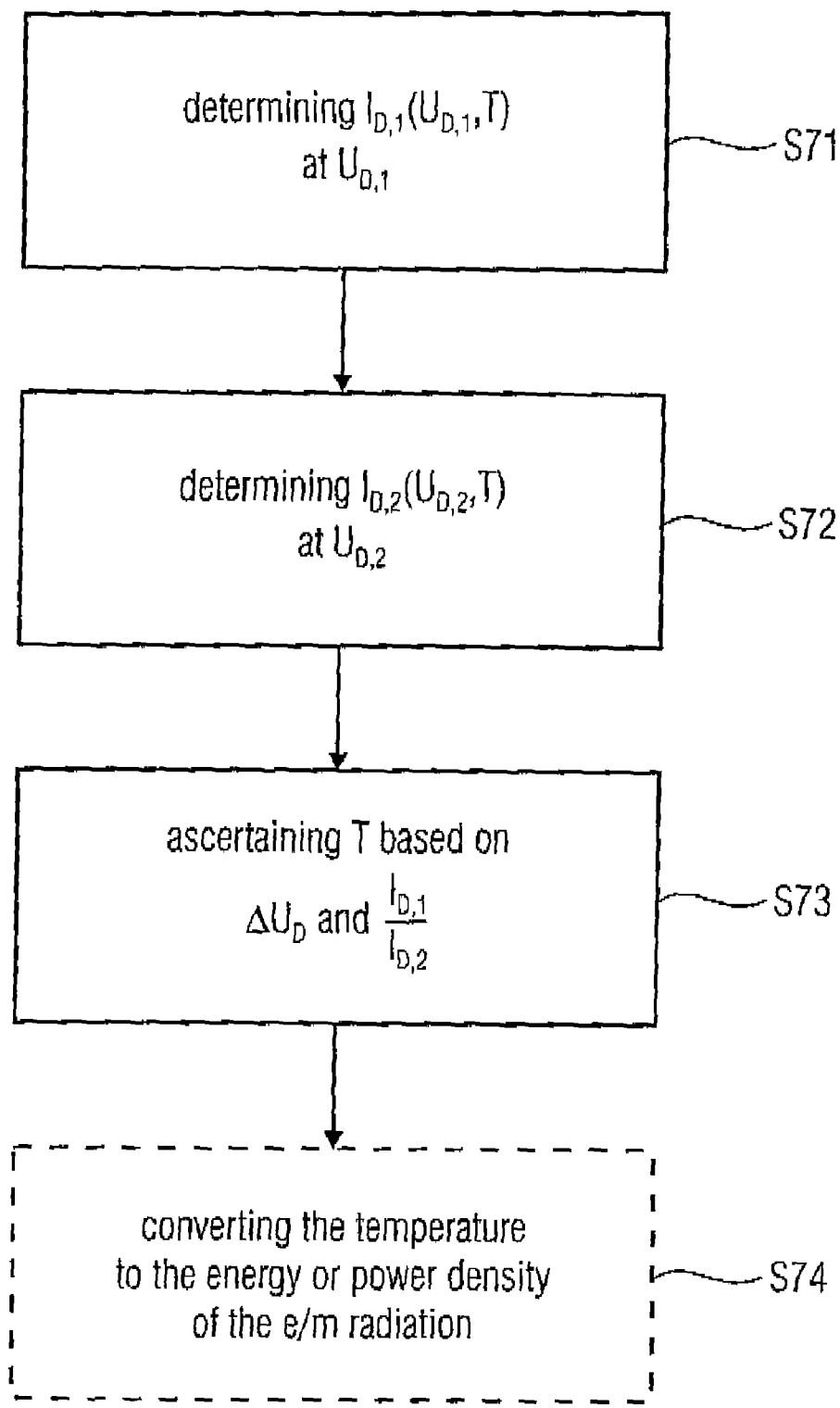
FIG. 7 is a flow diagram of a method for detecting electromagnetic radiation, according to a further embodiment of the present invention.
Figure 8:
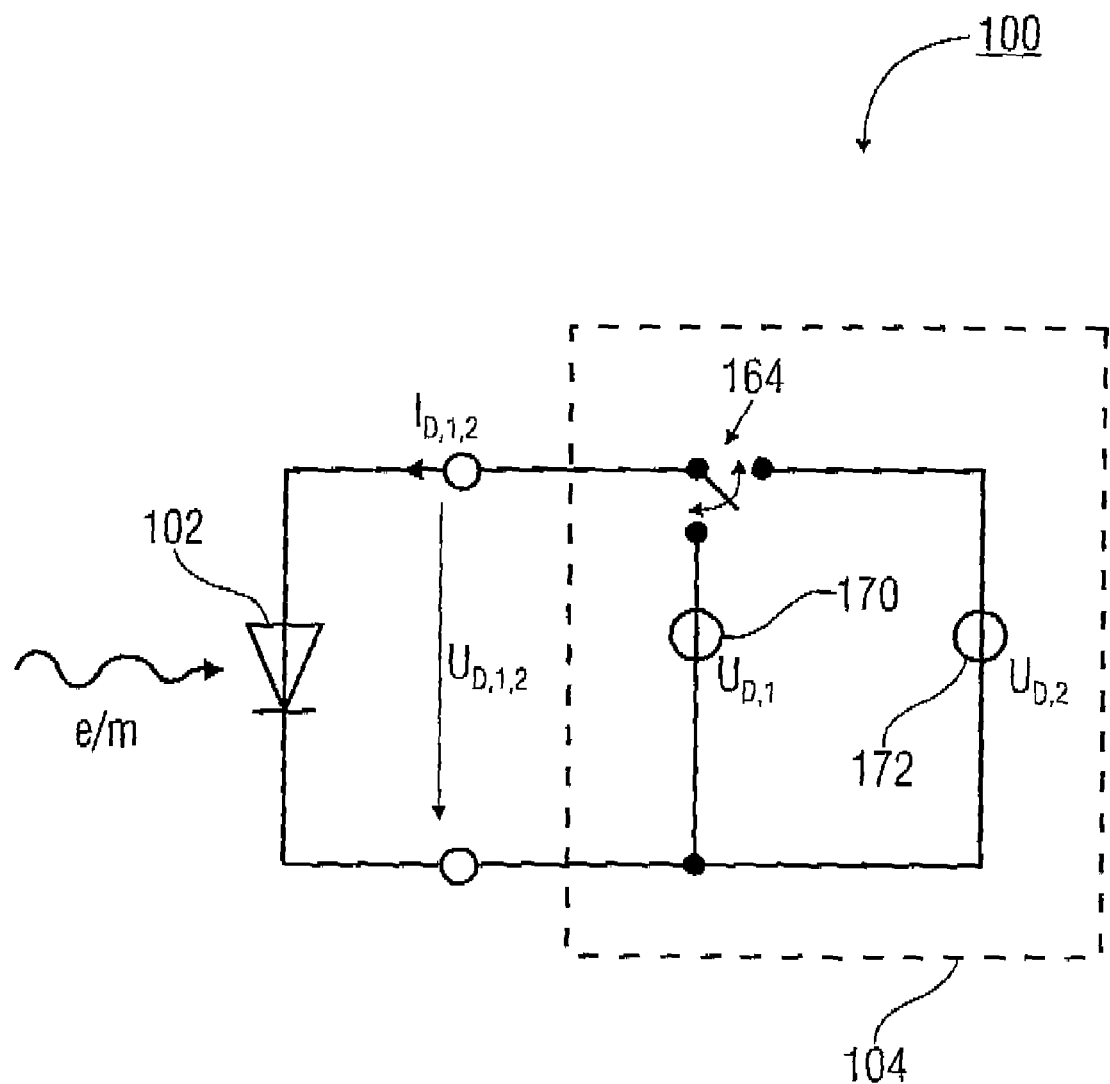
FIG. 8 is a schematic block diagram of a device for performing the method according to FIG. 7.

A bolometer, or a device 100, for detecting electromagnetic radiation according to the method illustrated in FIG. 7 is shown in FIG. 8.

According to embodiments, the means 104 for ascertaining the measurement value comprises two voltage sources 170 and 172 which may be selected via a switch 164. Here, the first voltage $U_{D,1}$ may be applied to the diode 102 with the first voltage source 170, and the second voltage $U_{D,2}$ may be applied to the diode of the diode structure 102 with the second voltage source 172.

To be able to determine the diode currents $I_{D,1}(U_{D,1},T)$ and $I_{D,2}(U_{D,2},T)$ resulting from the both voltages $U_{D,1}$ and $U_{D,2}$, the means 104 comprises a current measurement means (not shown) for the diode current. To determine the temperature T according to equation (11) from the measured diode currents $I_{D,1}(U_{D,1},T)$ and $I_{D,2}(U_{D,2},T)$ and the both constant voltages $U_{D,1}$ and $U_{D,2}$, the means 104 according to embodiments further comprises a processing means, such as a processor (not shown), for ascertaining temperature T.

During the measurement methods described in the foregoing, a bolometer according to embodiments, or the diode of the diode structure 102, heats up by the currents $I_{D,1}$ and $I_{D,2}$. Thus, the absolute temperature changes between respectively successive measurements. As a rule, a constant temperature T between successive measurements cannot be held. This change in temperature may be taken into account by a correction factor, for example, or may be compensated by a multiple measurement. In the case of the correction factor, an estimate for a change in temperature $\Delta T$ between two successive measurements, or an estimate for $\Delta T/T$ might be used, for example.

The described change in temperature ΔT due to the heating-up by the measurement current may be compensated by three or more measurements. For this, FIG. 9 schematically shows a temperature curve of diode 102 over time in four successive measurements.

In a first period of time between the points in time $t_1$ and $t_2$, a resulting diode current $I_{D,11}(U_{D,1},T_1)$ through the diode of the diode structure 102 is measured at a first voltage $U_{D,1}$ applied to the diode of the diode structure 102. Subsequently, that is, in the time periods $t_2$ to $t_3$ and $t_3$ to $t_4$, a second and a third measurement at an applied second voltage $U_{D,2}$ follow. Eventually, in the fourth period of time $t_4$ to $t_5$, a further measurement of a diode current $I_{D,14}(U_{D,1},T_4)$ at the constant first voltage $U_{D,1}$ follows.

The results, that is, the measured diode currents which have been respectively ascertained at the same applied voltage, may now be averaged. In the example shown in FIG. 9, this means that the diode current $I_{D,11}$ measured in the first period of time and the diode current $I_{D,14}$ measured in the fourth period of time are averaged to a diode current $I_{D,1}(U_{D,1}, T_m) = (I_{D,11}(U_{D,1},T_1) + I_{D,14}(U_{D,1},T_4))/2$. The same applies for the diode currents $I_{D,22}$ and $I_{D,23}$ measured in the second and third period of time at the applied diode voltage $U_{D,2}$, that is, $I_{D,2}(U_{D,2},T_m) = (I_{D,22}(U_{D,2},T_2) + I_{D,23}(U_{D,2},T_3))/2$. With an approximately linear behavior in the working point, the averaged diode currents correspond to measurements at a mean temperature $T_m$ during the entire readout operation. In particular, the mean temperature $T_m$ results according to $T_m = (T_1+T_4)/2 = (T_2+T_3)/2 = (T_1+T_2+T_3+T_4)/4$. It does percentually slightly deviate from the initial temperature $T_0$ due to the self-heating at the diode structure 102, but by the averaging, at least values result as would result in measurements all performed at a common temperature $T_m$.

Figure 9:
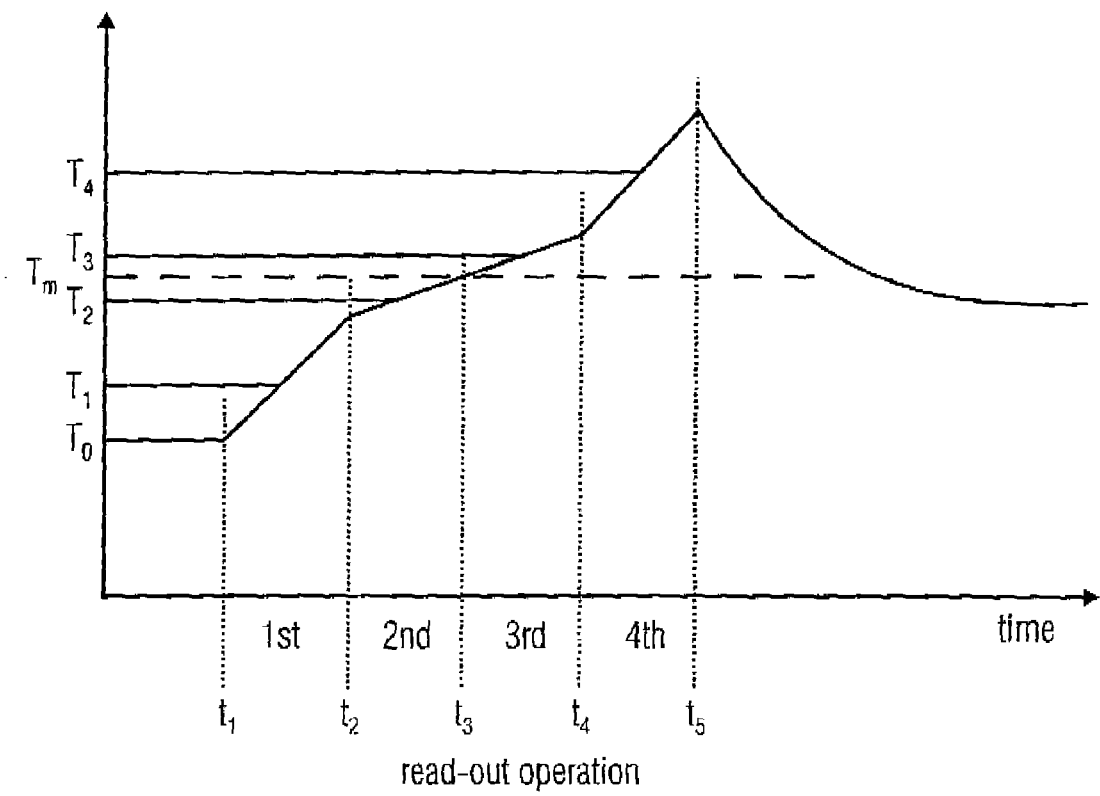
FIG. 9 is an illustration of a temperature and measurement curve in a method according to an embodiment of the present invention.

In the example illustrated in FIG. 9, the first applied voltage $U_{D,1}$ is larger than the second applied voltage $U_{D,2}$. By the higher loss power, the temperature increases faster during the first and the fourth measurement. After the measurement, the temperature again decreases from the point in time $t_5$, since no electrical power occurs anymore.

According to embodiments, in FIG. 9, only one measurement at the second voltage $U_{D,2}$ may be made instead of the two measurements 2 and 3, so that three measurements are performed on the whole. Here, the diode currents of the measurements 1 and 3 at the first voltage $U_{D,1}$ as described in the foregoing are then accordingly averaged.

Of course, the explanations just set forth are equally applicable for the method outlined in FIG. 5, that is, the impressing of constant currents $I_{D,1}$ and $I_{D,2}$ and the subsequent measurement of the respectively resulting diode voltages.

Further, it should be understood that the above embodiment may also be easily extended to more than four measurements, wherein the currents at the voltages $D_{D,1}$ and $D_{D,2}$ are ascertained.

In general, the temperature T of the diode 102, or the absorber of a bolometer, is influenced by the temperature of substrate 14. In a real bolometer, the variation in temperature by a change in the temperature of the substrate is much larger than by the incoming electromagnetic radiation. This effect, and also the self-heating of a bolometer, may be compensated by a so-called blind bolometer. In this context, a blind bolometer may be a bolometer which is not exposed to the electromagnetic radiation 18 since it is shielded by a plate, a reflector, such as at the surface of the diode structure, or similar, for example. Further, a blind bolometer may also be obtained by not providing any absorbing material for it in the diode structure, so that it is insensitive to the radiation of interest, such as heat or infrared radiation. Only a differential temperature between an active bolometer sensitive to electromagnetic radiation and a blind bolometer insensitive to electromagnetic radiation is caused by the electromagnetic radiation incident on the active bolometer. In this context, the differential temperature represents the useful signal, or the measurement value.

Figure 10:
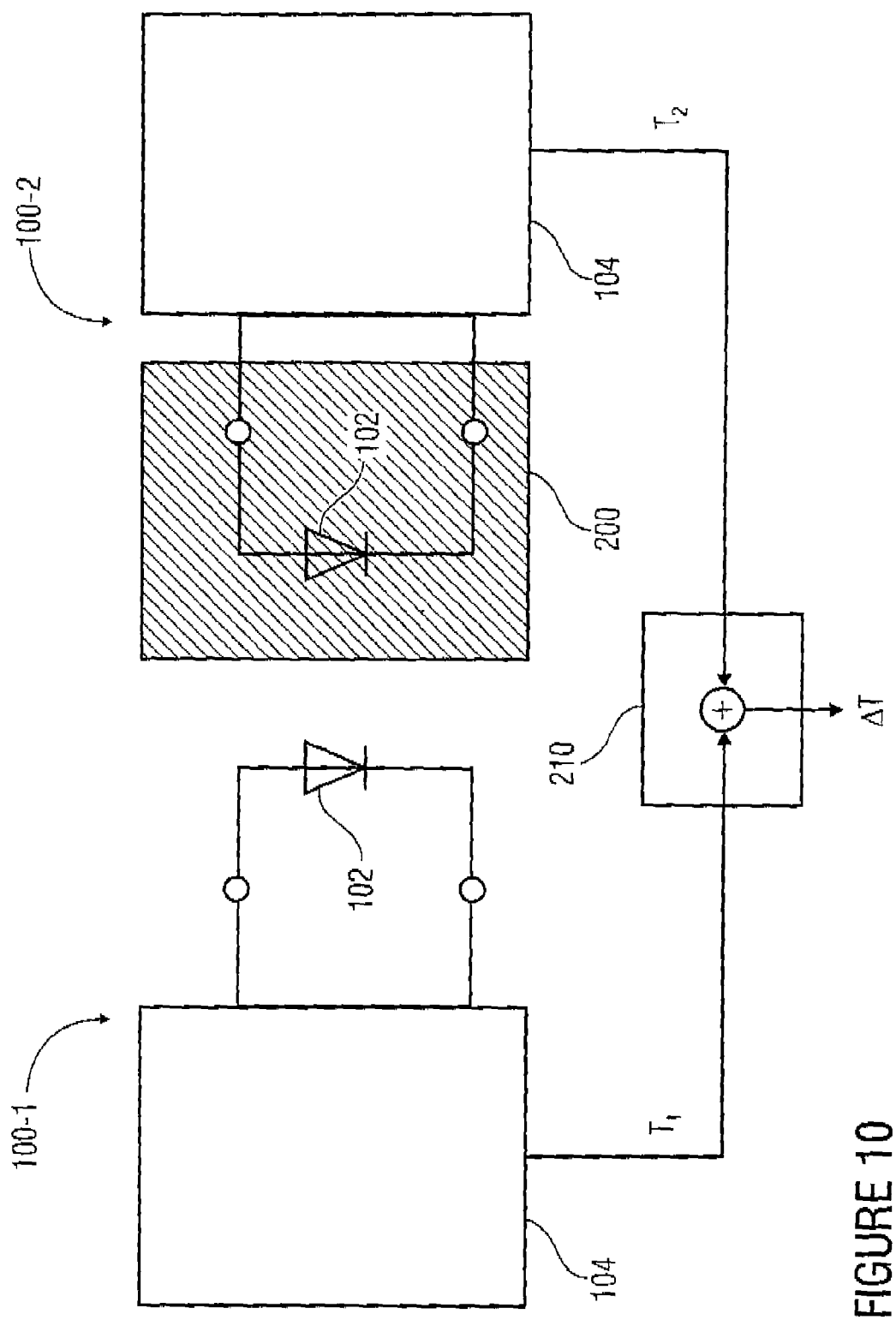
FIG. 10 is a schematic illustration of an active and a blind bolometer according to an embodiment of the present invention.

FIG. 10 schematically shows an interconnection of an active bolometer 100-1 and a blind bolometer 100-2 according to an embodiment.

Both the active bolometer 100-1 and the blind bolometer 100-2 shielded by a plate 200 from the electromagnetic radiation each comprise a diode 102 and a means 104 for ascertaining a respective one temperature $T_1$ and $T_2$. The temperatures ascertained are subtracted from each other by means of a subtractor 210, so that a differential temperature ΔT is obtained. This differential temperature ΔT is proportional to the electromagnetic radiation detected by the active bolometer 100-1.

Figure 2:
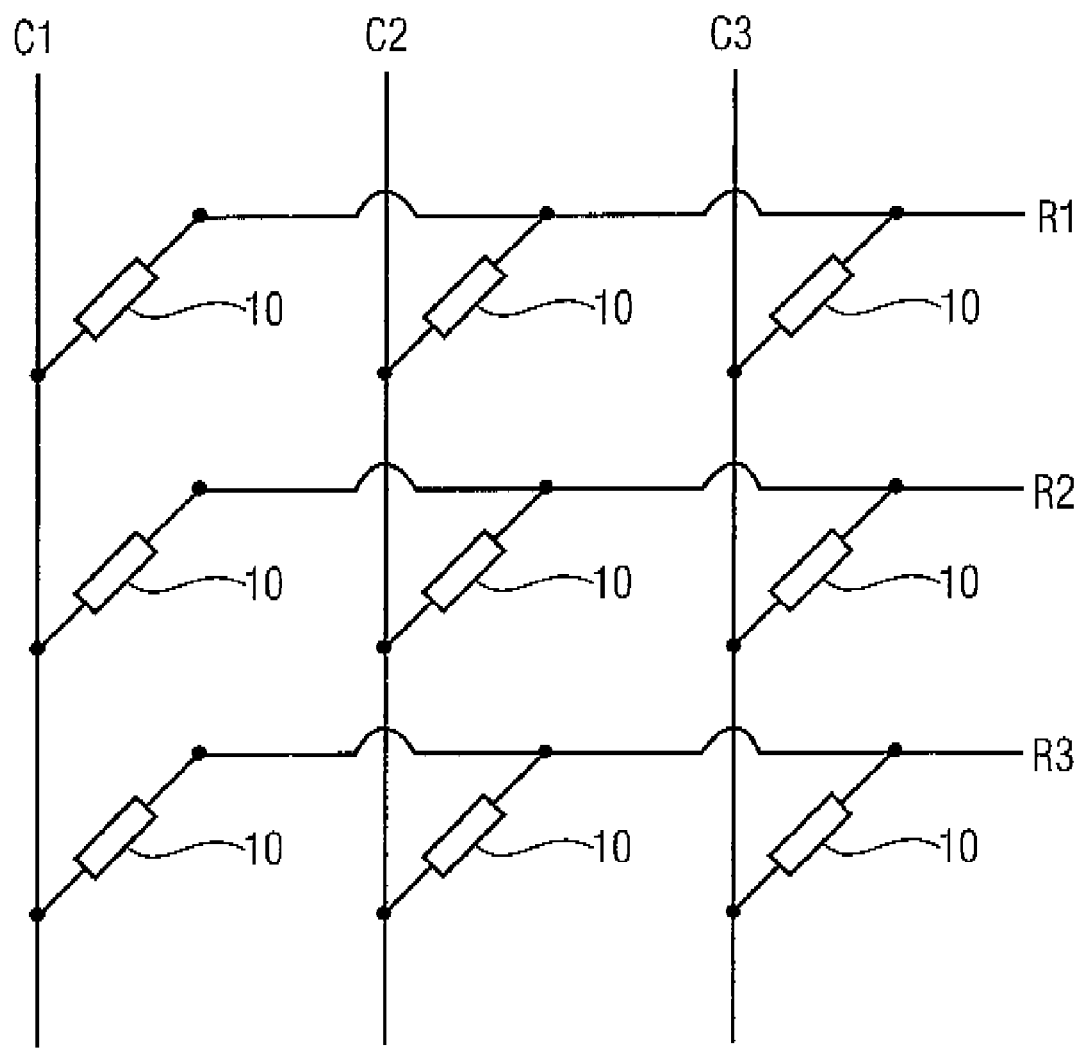
FIG. 2 is a schematic illustration of a 3×3 sensor array with bolometers.

In the bolometer array shown in FIG. 2, a blind bolometer could be provided in direct proximity to an active bolometer, respectively, which, in contrast to the respective active bolometer, is shielded from the electromagnetic radiation, as described with reference to FIG. 10. The temperature measurement in a blind bolometer is made according to the same principle, as has already been illustrated in the foregoing. Since both the blind bolometer and the active bolometer respectively heat up by the current flow through the diodes, this self-heating falls out of the temperature difference between the blind and the active bolometer. In forming the temperature difference between the active and the blind bolometer, the temperature of the substrate falls out, too. In this context, however, not each bolometer has to be associated with a blind bolometer. Rather, a smaller number of blind bolometers may be provided. The results thereof are latched, for example.

Figure 11:
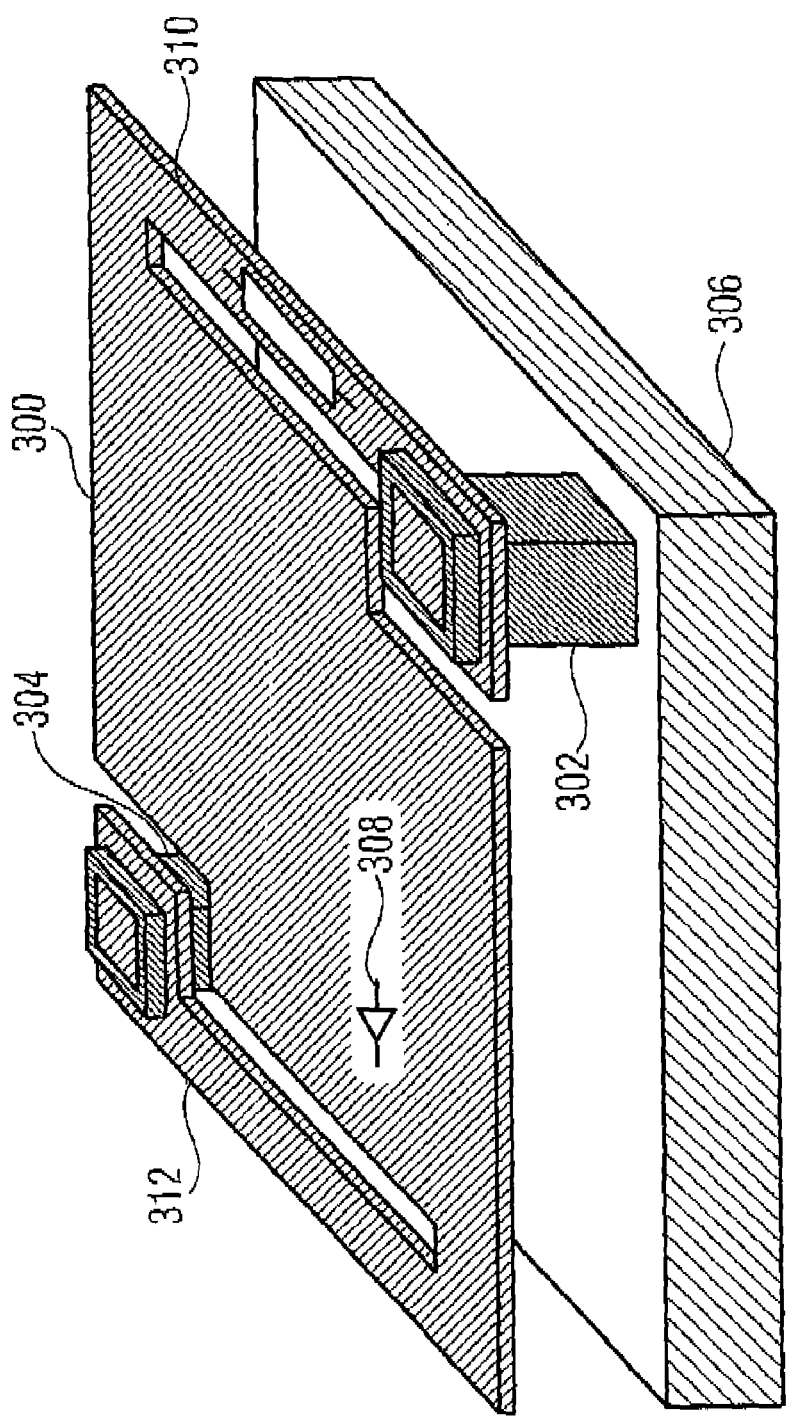
FIG. 11 is a spatial view of a diode structure spanned over a substrate.

FIG. 11 shows an embodiment of a diode structure mounted to a substrate, which might serve as a single sensor element as well as a sensor element, or pixel, in a pixel array, such as with 640×480 pixels. The same includes a thermometer membrane 300 spanned, at two of its edges, between two spacers 302 and 304 so as to be spaced from the substrate 306. Below the membrane on the substrate 306, a reflector layer (not shown) may be located, wherein the distance between the membrane 300 and the substrate 306 may be adjusted to λ/4, or a fourth of the wavelength λ, of the radiation of interest, such as to approximately 2.5 μm, wherein, however, the present embodiments are also applicable to wavelengths unequal to 10 μm. The spacers 302 and 304 not only fix the membrane 810 over the substrate 306, but also function as terminal posts establishing, at opposed ends of the membrane 300, an electrical contact between the respective end of the membrane 300 and the substrate 306 or metal pads formed thereon, a circuit integrated therein (not shown), or conductive traces (not shown) formed in or on the substrate 306, so that a thermal diode 308 formed in the membrane 300 and indicated as an outline in FIG. 11, is connectable to one of the ascertaining means mentioned in the foregoing. The ascertaining means may be embodied as a circuit (not shown) integrated in the substrate 306, e.g. as part of a readout integrated circuit ROIC.

To achieve a thermal sensitivity as high as possible, at the hung-up ends, membrane 300 may be formed such that it is connected to the spacers 302 and 304 via narrow portions 310 and 312, as exemplarily shown in FIG. 11, so that a thermal isolation of the membrane 300 810 may be accomplished.

For thermal isolation, the diode structure of FIG. 11 may further by located in a housing filled with a vacuum, although this is not shown in FIG. 11 for clarity. The vacuum avoids heat transport by convection.

The thermometer membrane 300 forms the diode structure previously mentioned. The membrane 300 may comprise plural layers. One pair or several of these layers may form a vertical diode. However, membrane 300 may also be fabricated such that it comprises a lateral diode, such as a PN-junction transversing across the membrane 300 in a layer of membrane 300. One or several of these layers or one or several additional other layer may act absorbingly for the electromagnetic radiation of interest, and, thus, may function as the absorber previously mentioned. Due to the electromagnetic radiation, the absorbing material heats up, and, thus, also the diode 308 formed in the membrane 300, which, in turn, thereby changes it current/voltage characteristic, as mentioned in the foregoing. From this change in characteristic, the ascertaining means previously mentioned then ascertains a measure for the incoming amount of radiation by means of several measurements, as mentioned in the foregoing.

Thus, FIG. 11 shows a possibility of converting electromagnetic radiation with wavelengths of 8 μm to 14 μm, for example, by means of an uncooled bolometer which may also be part of an uncooled two-dimensional micro bolometer array and which may further be directly integrated on a chip with a CMOS readout circuit.

From FIG. 11, it is further apparent that in the diode structure, the diode serves as a detector for the temperature of the diode structure, or the bolometer. Here, the membrane 300 of the bolometer may be formed of different layers, as mentioned, wherein one or several of the layers may function as an absorber. One or several further layer(s) may comprise a semiconductor in which the diode is located. The diode does not necessarily occupy the entire pixel area, but it may also extend over only a small part of the membrane. For example, with a suitable design of the semiconductor material, the diode layer may also assume the role of the absorber. In particular, silicon, gallium arsenide or similar are possible semiconductor materials. However, as mentioned in the foregoing, organic semiconductor materials may be used, too.

Embodiments of the present invention allow a readout of a bolometer without a previous calibration of the offset and a gain of the sensor, or absorber. A measurement of the offset during the operation is not needed either. Thereby, costs of the calibration, storage for the calibration data and the shutter mentioned at the beginning may be saved. Since with embodiments of the present invention no offset balancing is needed anymore during the operation, an image detection by means of a bolometer array, or a bolometer matrix, is not interrupted. In contrast to heat image cameras with a shutter, a scene may be continuously watched without any interruptions. There is no period of time in which no image capture is made. Additionally, with embodiments of the present invention, it is possible to determine the absolute temperature T of the sensor, or the diode. Since it also radiates heat, the temperature of the shutter had up to date to be taken into account when measuring the offset.

In summary, it should be understood that the present invention is not limited to the respective members of the device or the procedure explained, since these members may vary in the method. The terms used herein are only intended to describe particular embodiments and not as a limitation. If the singular or the indefinite article is used in the description and the claims, those also refer to the plural of these elements, unless the overall context clearly states otherwise. The same applies to the reverse.

In particular, it should be understood that depending on the circumstances, the inventive scheme may also be implemented in software. Implementation may occur on a digital storage medium, in particular a disc or CD with electronically readable control signals which can interact with a programmable computer system and/or a microcontroller such that the respective method is performed. Generally, the invention thus also consists in a computer program product with a program code, stored on a machine-readable carrier, for performing the inventive method when the computer program product runs on a PC and/or a microcontroller. In other words, the invention may thus be realized as a computer program having a program code for performing the method when the computer program runs on a computer and/or a microcontroller.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for detecting electromagnetic radiation, comprising:
    a diode structure acting absorbingly for electromagnetic radiation and comprising a diode; and
    means for ascertaining a measurement value for the absorbed electromagnetic radiation by means of at least two current/voltage measurements at the diode for different pairs of a diode current and a diode voltage.

2. The device according to claim 1, wherein the diode structure is formed on a substrate and thermally isolated therefrom.

3. The device according to claim 1, wherein the diode is formed as a pn diode.

4. The device according to claim 1, wherein the diode is formed as a Schottky diode.

5. The device according to claim 1, wherein the diode is formed by organic semiconductors.

6. The device according to claim 1, wherein the diode is a bipolar transistor connected as a diode.

7. The device according to claim 1, wherein the ascertainer for ascertaining the measurement value is formed to temporally successively apply at least two different voltages to the diode and, thereupon, to respectively use the resulting currents through the diode for ascertaining the measurement value.

8. The device according to claim 7, wherein the ascertainer for ascertaining the measurement value is formed to determine a temperature of the diode, based on the at least two different currents and the at least two different voltages.

9. The device according to claim 8, wherein the ascertainer for ascertaining the measurement value is formed to determine the temperature according to $$T = \frac{\frac{q}{k} \cdot \Delta U_D}{\ln(I_{D,1}) - \ln(I_{D,2})}$$

wherein q denotes the elementary charge, k denotes the Boltzmann constant and $\Delta UD$ denotes a difference of the at least two different voltages.

10. The device according to claim 1, wherein the ascertainer for ascertaining the measurement value is formed to temporally successively apply at least two different currents to the diode and, thereupon, to use the respectively resulting voltages at the diode for ascertaining the measurement value.

11. The device according to claim 1, wherein the ascertainer for ascertaining the measurement value is formed to compensate a self-heating caused by a current flow through the diode.

12. The device according to claim 11, wherein the ascertainer for ascertaining the measurement value is formed to compensate the self-heating of the diode by means of a correction factor.

13. The device according to claim 11, wherein the ascertainer for ascertaining the measurement value is formed to compensate the self-heating of the diode, by a determination of a mean diode current at a mean temperature by multiple measurements of a diode current at different temperatures and respectively the same voltage.

14. The device according to claim 11, wherein the ascertainer for ascertaining the measurement value is formed to compensate the self-heating of the diode, by a determination of a mean diode voltage at a mean temperature by multiple measurements of the diode voltage at different temperatures and respectively the same current.

15. The device according to claim 1, with a second diode structure comprising a second diode but shielded from or insensitive to the electromagnetic radiation, and an ascertainer for ascertaining a temperature for the second diode by means of at least two current/voltage measurements at the second diode for different pairs of a diode current and a diode voltage.

16. The device according to claim 15, wherein the device comprises more absorbingly acting diode structures than shielded or insensitive second diode structures.

17. A method for detecting electromagnetic radiation, comprising:
    absorbing the electromagnetic radiation with a diode structure acting absorbingly for the electromagnetic radiation and comprising a diode; and
    ascertaining a measurement value for the absorbed electromagnetic radiation by means of at least two current/voltage measurements at the diode for different pairs of a diode current and a diode voltage.

18. A non-transitory computer readable medium storing a computer program with a program code for performing, when run on a computer and/or a microcontroller, a method for detecting electromagnetic radiation, the method comprising:
    absorbing the electromagnetic radiation with a diode structure acting absorbingly for the electromagnetic radiation and comprising a diode; and
    ascertaining a measurement value for the absorbed electromagnetic radiation by means of at least two current/voltage measurements at the diode for different pairs of a diode current and a diode voltage.

* * * * *